(12) United States Patent
Vazquez et al.

(10) Patent No.: US 7,606,172 B2
(45) Date of Patent: Oct. 20, 2009

(54) SIMPLE SWITCH CONTROL LANGUAGE WITH SWITCH CONTROLLER

(75) Inventors: Pedro Vazquez, Revel (FR); Alejandro P. Lopez, Isere (FR); Pablo Martikian, Meylan (FR)

(73) Assignee: Sun Microsystems, Inc., Santa Clara, CA (US)

( * ) Notice: Subject to any disclaimer, the term of this patent is extended or adjusted under 35 U.S.C. 154(b) by 576 days.

(21) Appl. No.: 11/286,657

(22) Filed: Nov. 23, 2005

(65) Prior Publication Data

US 2007/0118622 A1    May 24, 2007

(51) Int. Cl.
*H04L 12/28* (2006.01)
(52) U.S. Cl. .................. 370/254; 370/400
(58) Field of Classification Search ........ 370/254, 370/400, 401
See application file for complete search history.

(56) References Cited

U.S. PATENT DOCUMENTS

| 6,473,430 B2 * | 10/2002 | Sreedharan et al. ..... 370/395.63 |
| 7,222,255 B1 * | 5/2007 | Claessens et al. ............. 714/4 |
| 2005/0213515 A1 * | 9/2005 | Wakumoto et al. .......... 370/254 |

* cited by examiner

*Primary Examiner*—Chirag G Shah
*Assistant Examiner*—Minh-Trang Nguyen
(74) *Attorney, Agent, or Firm*—Osha • Liang LLP

(57) ABSTRACT

A method for configuring a switch with a switch controller that includes obtaining a switch program, wherein the switch program comprises a plurality of instructions written using a switch control language, and executing the switch program on the switch controller, wherein executing the switch program includes for each instruction in the plurality of instructions determining a switch specified by the instruction, sending the instruction to the switch, and configuring the switch based on the instruction.

20 Claims, 6 Drawing Sheets

| Operation ID | Parameter 1 | Parameter 2 | Parameter 3 |
|---|---|---|---|
| SWITCH | <SW NAME ID A> ←428 | <CONCENTRATOR NAME> ←430 | <CONCENTRATOR PORT> ←432 |
| CONF_IN | <SW NAME ID B> ←434 | | |
| CONF_OUT | <SW NAME ID C> ←436 | | |
| CONF_ALL_IN | | | |
| CONF_ALL_OUT | | | |
| CONNE | <SW NAME ID D> ←438 | <PORT NUMBER A> ←440 | |
| DISCON | <SW NAME ID E> ←442 | <PORT NUMBER B> ←444 | |
| SHOW | <SW NAME ID F> ←446 | | |

FIGURE 4A

1. SWITCH SW1 196.87.23.102 2004
2. SWITCH SW2 206.52.123.2 2007
3. CONF_ALL_IN
4. CONNE SW1 20
5. CONNE SW1 22
6. CONNE SW2 22
7. CONNE SW2 20
8. DISCON SW1 20
9. DISCON SW1 22
10. DISCON SW2 22
11. CONNE SW1 20
12. CONNE SW1 22
13. CONF_ALL_OUT
14. SHOW SW1
15. SHOW SW2

SIMPLE SWITCH CONTROL LANGUAGE WITH SWITCH CONTROLLER

BACKGROUND

A network typically corresponds to a group of nodes, a connection medium, and connecting devices. A node may correspond to any type of computing device, such as a server, laptop computer, desktop computer, printer, copier, etc. The connection medium corresponds to the wires or the wireless mechanisms for connecting the nodes. The connecting devices are the devices which allow two or more nodes to communicate. Using the interconnection, nodes communicate to provide greater functionality to the users. The connecting devices may correspond to a router, hub, concentrator, switch, or any other such device.

In an information transmission network, consisting of at least two nodes, a connection medium, and at least one connecting device, a switch is a connecting device that filters and forwards packets between local area network (LAN) segments. Often a switch is referred to as a packet switch, according to some dictionaries, in order to refer specifically to networking and the fact that the switch itself often decides where and how to send the packets. Further, a switch may be connected to another connecting device and/or to one or more nodes.

A switch typically includes ports, memory, and a processing mechanism. Each segment that is connected to the switch is connected to a port on the switch. The segment may include one or more nodes connected via the connection medium and connecting devices to the switch. In order to provide greater throughput and performance, a switch must typically perform several operations.

For example, one such operation involves populating a table of nodes and segments. Specifically, the switch typically uses a table in memory to maintain the correspondence between nodes and the segment to which the nodes are connected. In order to automatically populate the table, the switch may perform a learning algorithm whereby the switch may receive a message for a receiving node from a sending node on a segment and broadcast the message. When a response is received from the receiving node, then the switch adds the information of the receiving node to the table. The switch may depopulate the table based on an aging algorithm whereby the oldest additions to the table are deleted.

Another example of an operation performed by a switch is in learning the best routes to a node. Specifically, networks typically use redundancy in order to ensure a single point of failure does not exist. Accordingly, networks may be composed of thousands of switches and segments. In order to ensure that the network is not flooded with messages, the switch may use a cooperative process to determine the best route to a particular node. As part of the cooperative process, switches may use a weight function associated with bandwidth and segments. The weight function may be derived from the switch or inputted into the switch as part of the configuration settings.

In general, operations performed by the switch (e.g., maintaining the table, determining the best route to node, etc.) are adjusted by administrators modifying configuration parameters, such as age of records in the table, weight functions, port settings, etc. of the switch. Specifically, in order to ensure that the network is functioning properly, the switches must be configured, tested, and often reconfigured. Configuring and testing each switch typically requires an administrator accessing each switch in the network through a command line interface, opening a configuration file of the switch, or manually walking to each switch and turn on an off toggle buttons on the switch. Accordingly, when multiple switches must be configured and tested, each command for each switch is typically performed separately.

SUMMARY

In general, in one aspect, the invention relates to a method for configuring a switch with a switch controller comprising obtaining a switch program, wherein the switch program comprises a plurality of instructions written using a switch control language, and executing the switch program on the switch controller, wherein executing the switch program comprises for each instruction in the plurality of instructions determining a switch specified by the instruction, sending the instruction to the switch, and configuring the switch based on the instruction.

In general, in one aspect, the invention relates to a computer readable medium for configuring a switch using a switch controller comprising instructions configured to obtain a switch program, wherein the switch program comprises a plurality of instructions written using a switch control language, and execute the switch program on the switch controller, wherein executing the switch program comprises for each instruction in the plurality of instructions determining a switch specified by the instruction, sending the instruction to the switch, and configuring the switch based on the instruction.

In general, in one aspect, the invention relates to a system for configuring a switch comprising a switch program, wherein the switch program comprises a plurality of instructions written using a switch control language, a switch controller accessing the switch program configured to execute the switch program, wherein executing the switch program comprises for each instruction in the plurality of instructions determining a switch specified by the instruction, sending the instruction to the switch, and configuring the switch based on the instruction.

Other aspects and advantages of the invention will be apparent from the following description and the appended claims.

BRIEF DESCRIPTION OF DRAWINGS

FIG. 4A shows a table with an example set of instructions in accordance with one or more embodiments of the invention.

DETAILED DESCRIPTION

Figure 1:
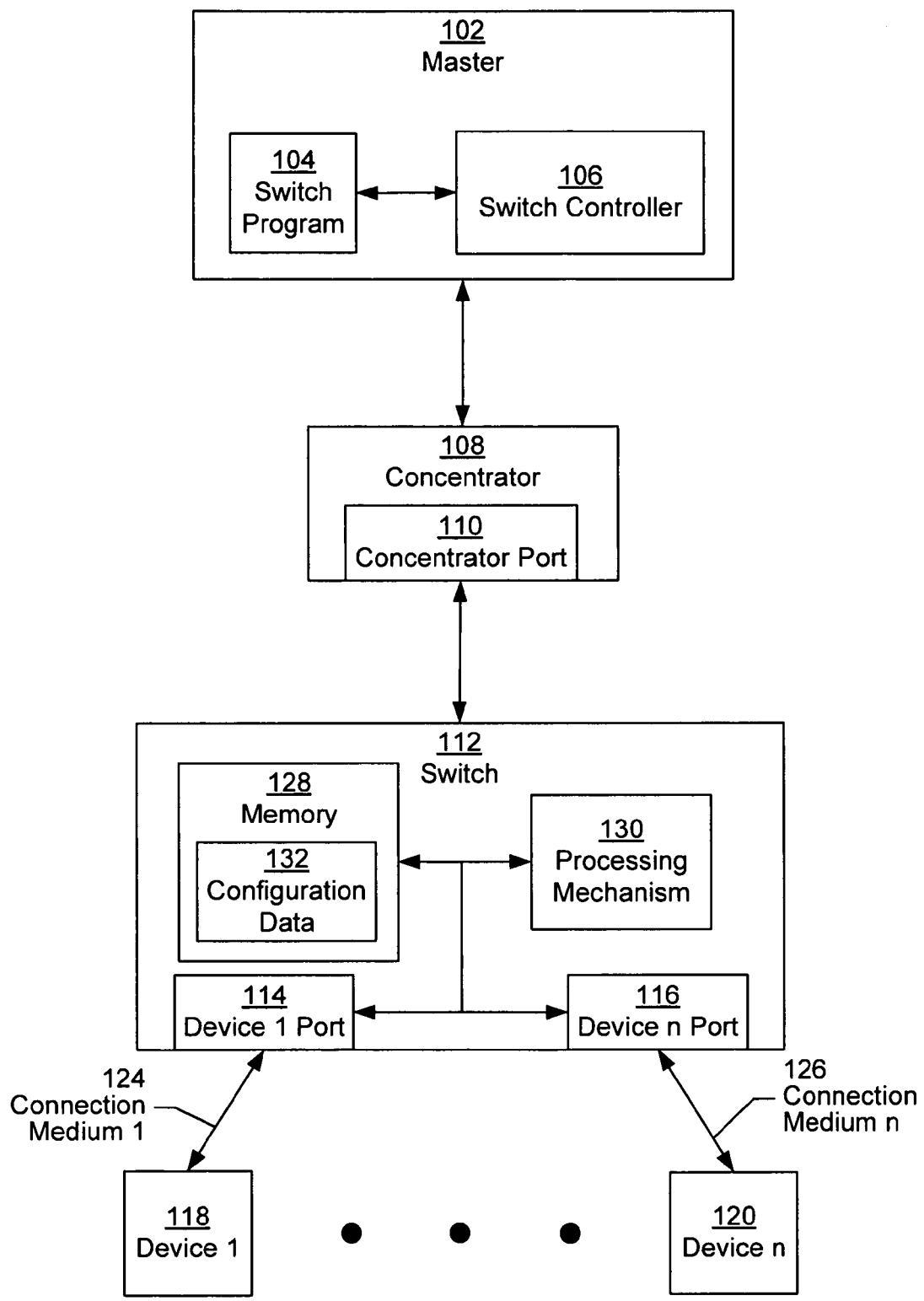
FIG. 1 shows a block diagram of a system for a switch control language in accordance with one or more embodiments of the invention.

Specific embodiments of the invention are described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to a method and system for implementing a switch control language. Specifically, embodiments of the invention provide a language for writing a switch program in which multiple switches may be configured using single instructions. Further, the series of changes to the configuration settings of the switch may be performed repetitively by simply executing the switch program of the switch.

FIG. 1 shows a block diagram of a system for a switch control language in accordance with one or more embodiments of the invention. FIG. 1 includes a master (102), a concentrator (108), a switch (112), and devices (e.g., device 1 (118), device n (120)). Each of these aforementioned components is described in more detail below.

In one or more embodiments of the invention, the devices (e.g., device 1 (118), device n (120)) may correspond to nodes, hubs, routers, other switches, etc. A node, for example, may correspond to a computing device (e.g., computer, personal digital assistant (PDA), etc.), printer, copier, etc. When the device (e.g., device 1 (118), device n (120)) is a hub, router, etc., then the device may be connected to other devices.

Connected to the device (e.g., device 1 (118), device n (120)) via a connection medium (e.g., connection medium 1 (124), connection medium n (126)) and ports on the switch (e.g., device 1 port (114), device n port (116)) is a switch (112). The connection medium (e.g., connection medium 1 (124), connection medium n (126)) may correspond to a wired or wireless mechanism for transmitting signals from the switch (112) to the device (e.g., device 1 (118), device n (120)).

A switch (112), in one or more embodiments of the invention, is a device which includes functionality to transmit signals in the form of packets, datagrams, etc. to other devices (e.g., device 1 (118), device n (120)). The switch (112) may include ports (e.g., device 1 port (114), device n port (116) for each device, memory (128), and a processing mechanism (130). The memory (128) of the switch (112) may include configuration data (132) that has the configuration settings for the switch (112). The memory (128) may also include a table for maintaining information regarding the location of nodes in relation to the ports (e.g., device 1 port (114), device n port (116)) of the switch (112).

In one or more embodiments of the invention, a switch (112) is connected to a concentrator (108) using a concentrator port (110). Those skilled in the art will appreciate that a newly bought switch may not be configured to access the network. Accordingly, in one or more embodiments of the invention, the concentrator (108) includes functionality to allow access to the switch (112) via a serial connector (not shown) on the switch (112) and a concentrator port (110) on the concentrator (108). Typically, multiple switches (e.g., switch (112)) and other devices may be connected to the concentrator (108). Accordingly, the concentrator (108) typically has multiple concentrator ports (e.g., concentrator port (110)) and each concentrator port (e.g., concentrator port (110)) connected to a single switch (e.g., switch (112)) or other device (not shown).

Continuing with FIG. 1, a master (102) is connected to the concentrator. The master (102), in one or more embodiments of the invention, corresponds to a computing device (e.g., computer, personal digital assistant (PDA), etc.) which allows input from a user (not shown). Those skilled in the art will appreciate that while the master (102) in FIG. 1 is shown as connected to the switch (112) via a concentrator (108), the master (102) may also be directly connected to the switch (112) via a network and one of the ports (e.g., device 1 port (114), device n port (116)) on the switch. Accordingly, the switch controller (106) (described below) may be modified to access the switch (112) directly. Further, the master (102) may include a switch program (104) and a switch controller (106). In one or more embodiments of the invention, the switch program (104) is written in a switch control language (described below).

In one or more embodiments of the invention, each instruction in the switch control language is an n-tuple including an operation identifier, and one or more parameters for the operation. The operation identifier identifies the operation to perform on the switch (112), such as "conf_in" for the operation of enter configuration mode on the switch (112), "switch" to create an alias for the switch (112), etc. The parameters correspond to any extra information required for performing the operation specified by the operation identifier, such as the switch name. The switch name corresponds to the alias of the switch (112), a unique identifier for the switch (112), or a concentrator (108) identifier and concentrator port (110) identifier. Those skilled in the art will appreciate that some of the instructions in the switch control language may not include parameters. For example, instructions that relate to multiple switches may not include a single switch name. Further, certain instructions may not require any parameters.

The switch control language, in one or more embodiments of the invention, may include instructions to perform virtually any configuration operation on a switch (112), such as turning on and off ports (e.g., device 1 port (114), device n port (116)), configuring weight parameters for determining the shortest path to the nodes, configuring aging parameters for the table, configuring domain and subnet identification information, setting parameters on the switch (112) (e.g., memory parameters), etc.

Continuing with FIG. 1, a switch controller (106) is connected to the switch program (104). The switch controller (106), in one or more embodiments of the invention, includes functionality to parse the source code of the switch program (104), and execute each instruction. Specifically, the switch controller (106) may correspond to a program that may be executed using a command line interface. Accordingly, the switch controller (106) may include functionality to access the switch (112) and send the instructions to the switch (112) via the concentrator (104).

Figure 2:
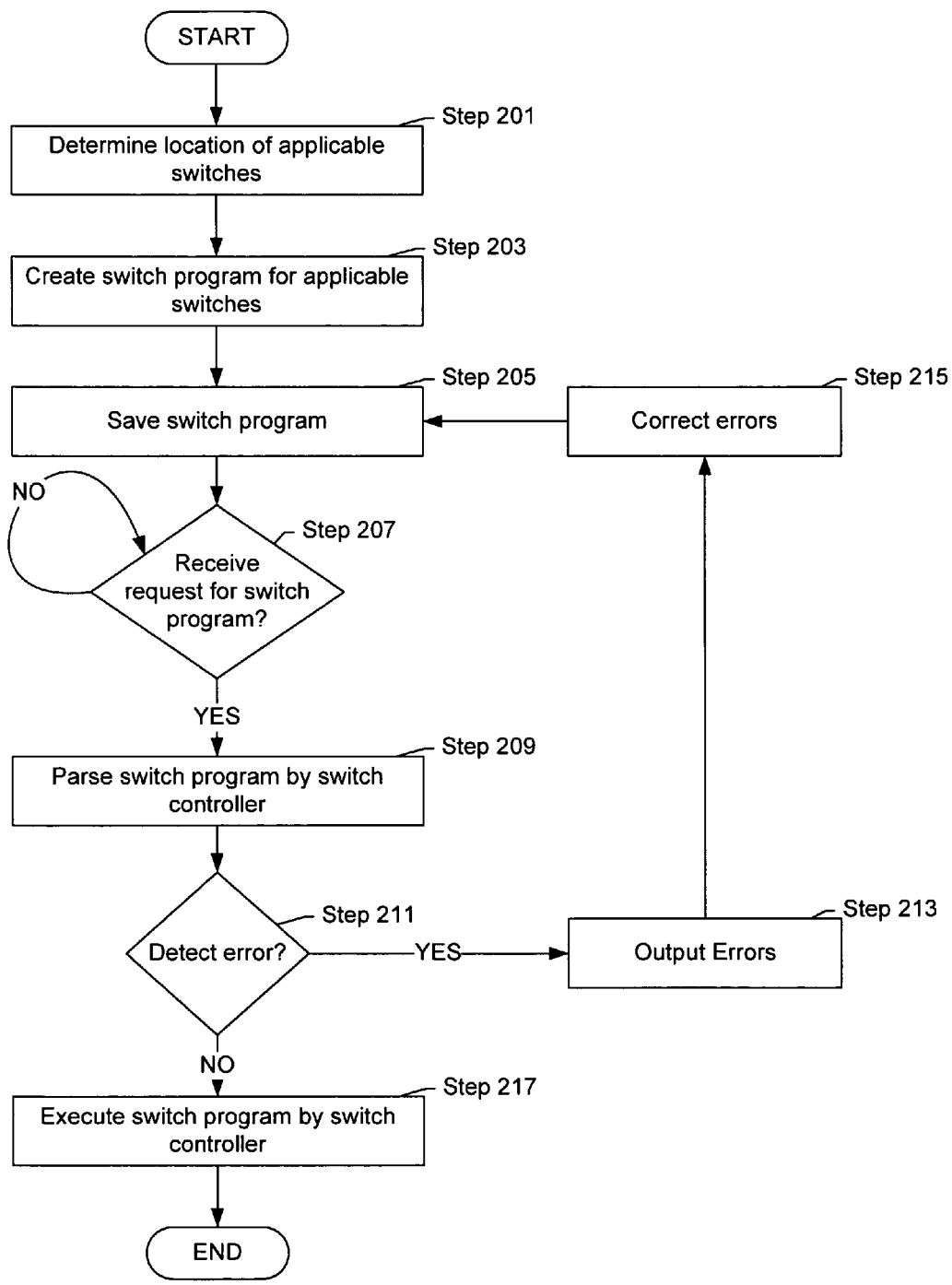
FIG. 2 shows a flowchart of a method for writing and executing a switch program using the switch control language in accordance with one or more embodiments of the invention.

FIG. 2 shows a flowchart of a method for writing and executing a switch program using the switch control language in accordance with one or more embodiments of the invention. Initially, the location of the applicable switches is determined (Step 201). Specifically, the location of the switches may be identified by a concentrator port and concentrator identifier of the switch. Alternatively, the location of the switches may be identified by a device discovery controller which searches the network for new hardware. For example, a user may specify a unique hardware address of the switch and the device discovery controller may determine the location of the switch using the hardware address.

Next, a switch program is created for the applicable switches (Step 203). Typically, the switch program is created by a user coding the switch program using the switch control language, which specifies the operation(s) to perform on the switches. After the switch program is created, the switch program is saved (Step 205). Next, a determination is made whether a request is received for the switch program (Step 207). Specifically, in one or more embodiments of the invention, a request is received when a user types in the switch controller name to indicate that the user desires to execute the switch controller program. Further, the user may add as an argument to the switch controller program, the name of the switch program. Alternatively, the switch controller program may request the name of the switch program from the user during execution.

Continuing with FIG. 2, if a request is not received, then the switch program waits in storage. Otherwise, when a request is received, the switch controller program is instantiated. Next, the switch program is parsed by the switch controller (Step 209). Specifically, parsing the switch program may divide in the switch program into tokens (i.e., component(s) of an instruction), transform the instructions into a parse tree, and analyze the parse to determine whether the switch program follows the semantics or rules of the switch control programming language.

Accordingly, after parsing the switch program, a determination is made whether at least one error is detected (Step 211). If at least one error is detected, then the error(s) is outputted (Step 213). Thus, the user may correct the error (Step 215) and continue with saving the switch program (Step 205). Alternatively, if no errors are detected while parsing the switch program, then the switch program is executed by the switch controller (Step 217).

Figure 3:
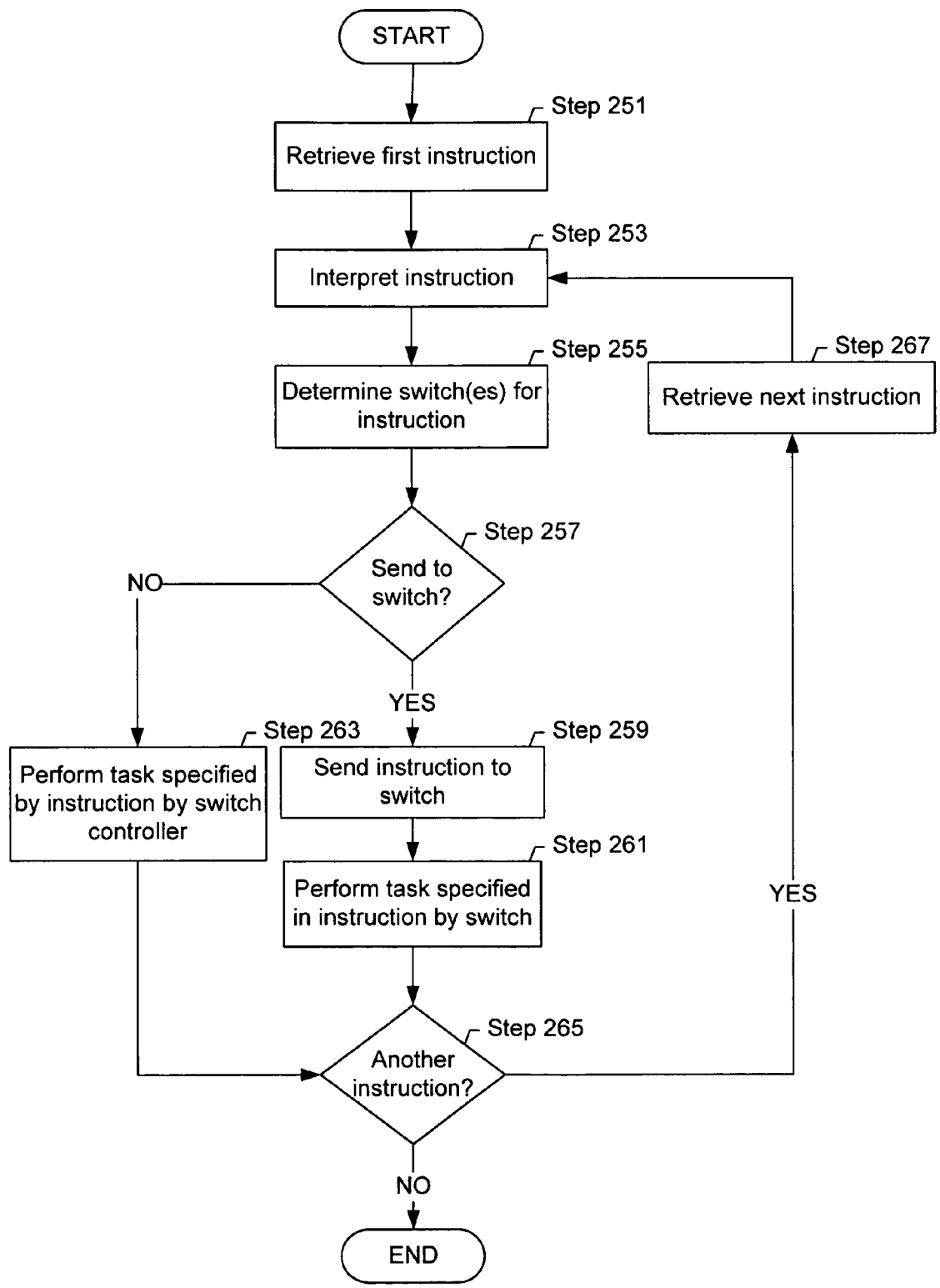
FIG. 3 shows a flowchart of a method for executing the switch program using the switch control language in accordance with one or more embodiments of the invention.

FIG. 3 shows a flowchart of a method for executing the switch program using the switch control language in accordance with one or more embodiments of the invention. Initially, the first instruction is retrieved from the parsed switch program (Step 251). Next, the instruction is interpreted by the switch controller (Step 253). Specifically, the instruction may be transformed into computer readable format that the processor understands.

After interpreting the instruction, the applicable switch(es) is determined for the instruction (Step 255). After determining the applicable switches, a determination is made whether the instruction should be sent to the switch (Step 257). If the instruction should not be sent to the switch, then the task specified by the instruction is performed by the switch controller (Step 263). For example, an instruction defining an alias for the switch is performed by the switch controller.

Alternatively, if the instruction should be sent to the switch, then the instruction is sent to the switch (Step 259) and the task specified by the instruction is performed by the switch (Step 261). Once the task is performed by the switch, then a determination is made whether another instruction exists in the switch program (Step 265). If another instruction exists in the switch program, then the next instruction is retrieved in the same manner discussed above (Step 267) and the method continues with Step 253. Alternatively, the switch program and the switch controller program ends.

FIG. 4A shows a table (400) with an example set of instructions in accordance with one or more embodiments of the invention. In FIG. 4A, instructions may specify an operation identifier (402) and one or more parameters (e.g., parameter 1 (404), parameter 2 (406), parameter 3 (408)). Each example instruction (e.g., switch (410), conf_in (412), conf_out (414), conf_all_in (416), conf_all_out (418), conne (420), discon (422), show (424)) in the table is described below.

In this example, the switch instruction (410) provides an alias for the switch. Specifically, in one or more embodiments of the invention, the switch instruction takes as input parameters a switch name (e.g., SW NAME ID A (428)) to be used as an alias for the switch, a concentrator name (e.g., CONCENTRATOR NAME (430)), and the concentrator port name (e.g., CONCENTRATOR PORT (432)). Those skilled in the art will appreciate that the switch instruction (410) may use virtually any known identifier for the switch as parameters in order to create an alias for the switch.

Continuing with FIG. 4A, conf_in (412) and conf_out (414) instructions specify the configuration mode of the switch. Specifically, the conf_in (412) instruction specifies that the switch should enter configuration mode and the conf_out (414) instruction specifies that the switch should exit the configuration mode. As part of the input parameters, in one or more embodiments of the invention, the conf_in (412) and conf_out (414) instructions use as an input parameter the switch name (e.g., SW NAME ID B (434), SW NAME ID C(436)).

Similar to the conf_in (412) and conf_out (414) instructions, in one or more embodiments of the invention, the conf_all_in (416) instruction and the conf_all_out (418) instruction may be used to specify that all switches that have an alias should enter or exit configuration mode. Using commands that specify multiple switches saves time for the user in creating the switch program.

Continuing with FIG. 4A, conne (420) instruction may be used to connect a device port on a switch and allow for the device port to be operable. In contrast the discon (422) instruction may be used disconnect a device port from a switch. In one or more embodiments of the invention, the conne (420) instruction and the discon (422) instruction uses as input parameters a switch name (e.g., SW NAME ID D (438), SW NAME ID E (442)) and a port number (e.g., PORT NUMBER A (440), PORT NUMBER B (444)) on the switch.

The switch controller language may also have a show (424) instruction. In one or more embodiments of the invention, the show instruction allows a user to see which device ports on the switch (specified by the switch name id (e.g., SW NAME ID F (446))) are operable and which device ports on the switch are not operable.

Those skilled in the art will appreciate that the set of instructions described in FIG. 4A may be modified, added to, and/or deleted in the switch control language. Specifically, the operation identifiers for the instruction may be modified, the instructions could use different parameters (e.g., using more than one switch name), etc. More specifically, more instructions may be added to the set of instructions to allow for modifying other configuration settings (as described above with FIG. 1).

Figure 4B:
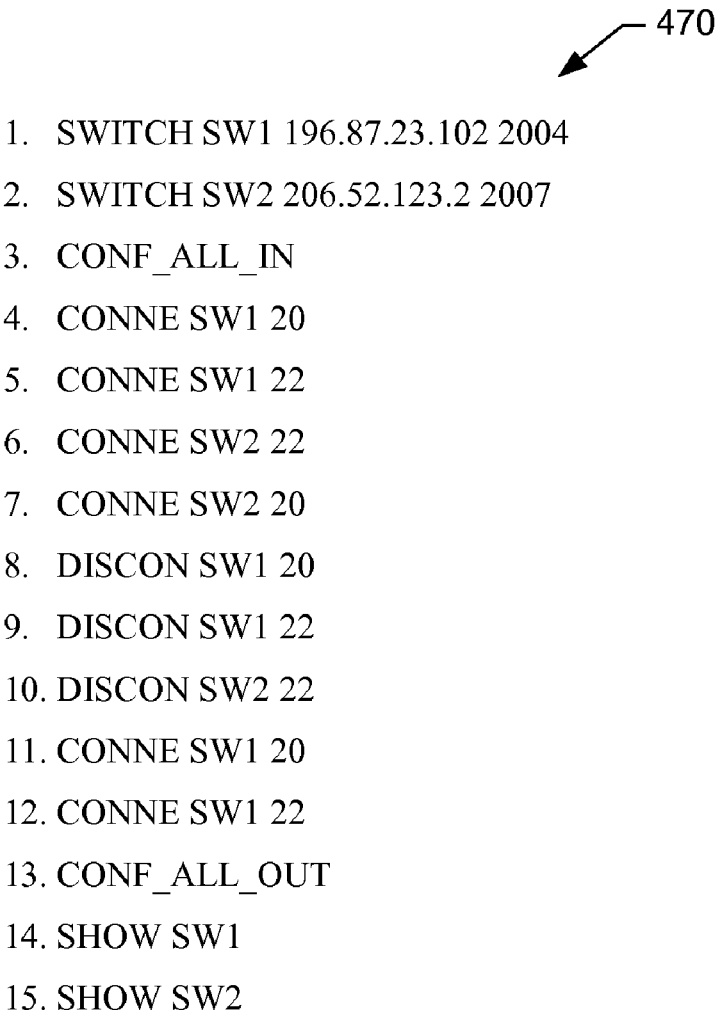
FIG. 4B shows an example switch program and output of the switch program using the example instructions described in FIG. 4A.
Figure 4B:
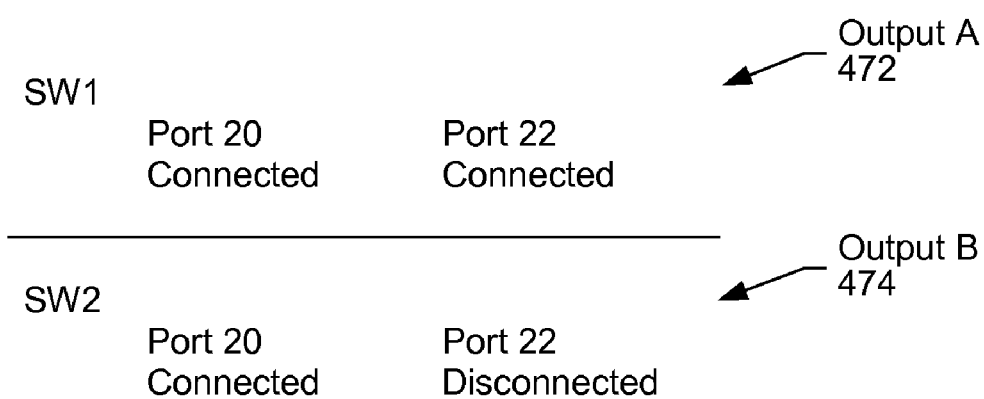

FIG. 4B shows an example switch program (470) and output (e.g., output A (472), output B (474)) of the switch program (470) using the example instructions described in FIG. 4A. Lines 1 and 2 of the switch program specify an alias SW1 and SW2 to use for the switches defined by port 2004 on concentrator 196.87.23.102 and port 2007 on concentrator 206.52.123.2. Line 3 specifies that both switch SW1 and switch SW2 should enter configuration mode. Lines 4-7 connect the device ports 22 and 20 on SW1 and SW2. On line 8, device port 20 is disconnected for SW1. Similarly on line 9, device port 22 on SW1 is disconnected. In line 10, device port 22 on SW 2 is disconnected. Lines 11-12 connect device ports 22 and 20 on SW1. Finally, line 13 specifies that all of the switches should exit configuration mode. Lines 14 and 15 specify that the current output be shown.

In the output for switch SW1 (472), port 20 is shown as connected and port 22 is shown as connected. In the output for switch SW2 (474), port 20 is shown as connected, and port 22 is shown as disconnected. Port 22 is disconnected because Port 22 of SW2 is not specified to be connected after line 17.

As shown in the aforementioned example, using the switch control language allows for multiple switches may be easily configured and reconfigured simply by executing a switch program.

Figure 5:
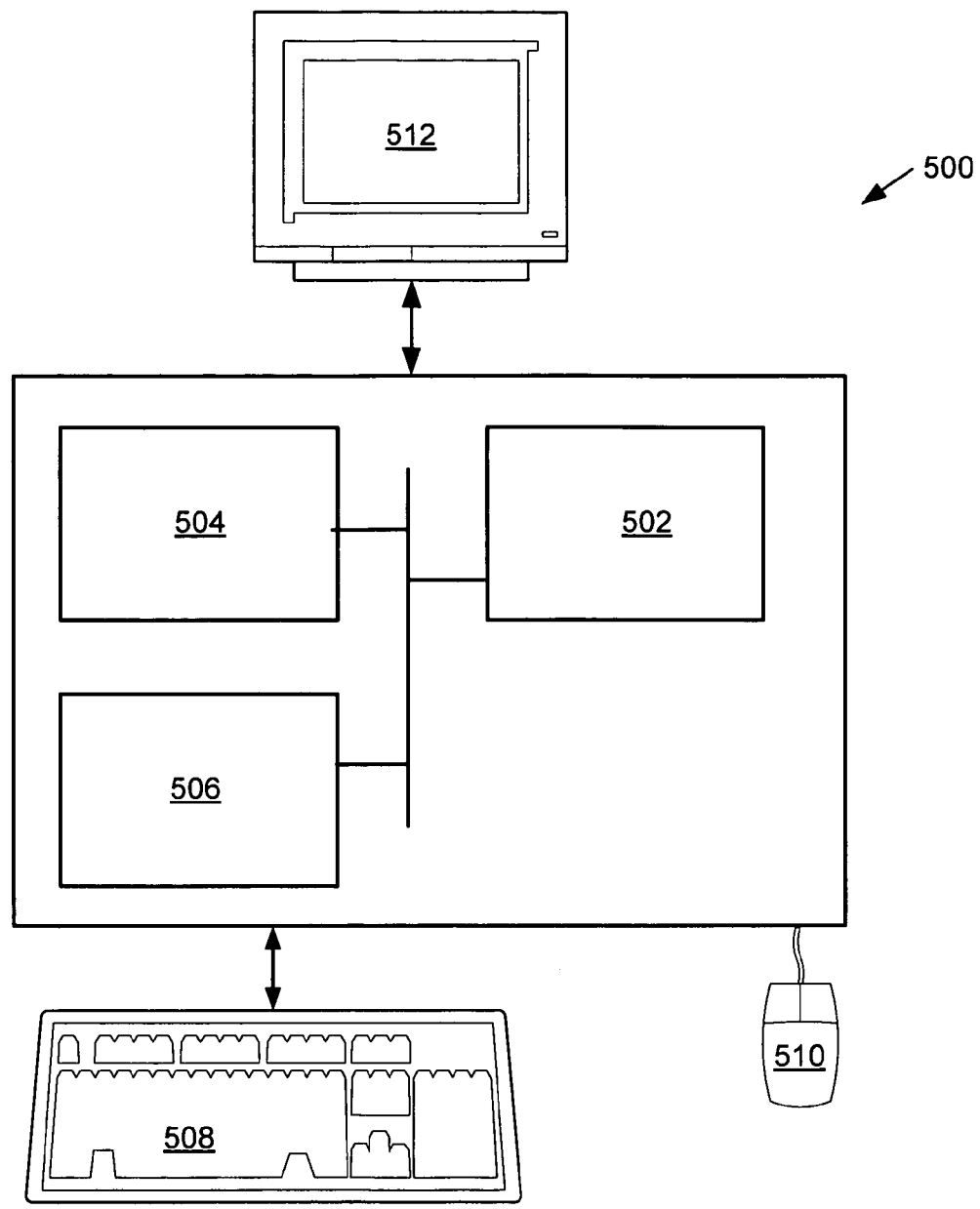
FIG. 5 shows a computer system in accordance with one or more embodiments of the invention.

The invention may be implemented on virtually any type of computer regardless of the platform being used. For example, as shown in FIG. 5, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (500) may be located at a remote location and connected to the other elements over a network. Further, the invention may be implemented on a distributed system having a plurality of nodes, where each portion of the invention (e.g., switch controller, switch program, switch, etc.) may be located on a different node within the distributed system. In one or more embodiments of the invention, the node corresponds to a computer system. Alternatively, the node may correspond to a processor with associated physical memory. The node may also alternatively correspond to a processor with shared memory and/or resources. Further, software instructions to perform embodiments of the invention may be stored on a computer readable medium such as a compact disc (CD), a diskette, a tape, a file, or any other computer readable storage device.

Embodiments of the invention have one or more of the following advantages. First, embodiments of the invention provide a simple switch control language that may be used to remotely and efficiently configure a switch. Specifically, many network environments (e.g., labs, departments, companies, etc.) use potentially hundreds of switches. Embodiments of the invention allow for configuring each of the multiple switches in an efficient manner.

Further, by creating a switch program, embodiments of the invention create a mechanism whereby a switch may be tested and retested by simply executing a switch program. Thus, using a switch program to test the switch to ensure that the network is functioning properly is easier than accessing the switch directly and configuring the switch manually.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for configuring a plurality of switches with a switch controller comprising:
   obtaining a switch program, wherein the switch program comprises a plurality of instructions written using a switch control language, wherein the plurality of instructions in the switch program identify the plurality of switches, and wherein the switch program defines a heterogeneous configuration of the plurality of switches; and
   executing the switch program on the switch controller, wherein executing the switch program during a single execution of the switch program comprises:
      identifying, from the plurality of instructions, a first switch of the plurality of switches;
      sending a first configuration to the first switch, wherein the first configuration is defined for the first switch in the plurality of instructions;
      configuring the first switch according to the first configuration;
      identifying, from the plurality of instructions, a second switch of the plurality of switches;
      sending a second configuration to the second switch, wherein the second configuration is defined for the second switch in the plurality of instructions; and
      configuring the second switch according to the second configuration,
      wherein the second switch is not configured with the first configuration, and
      wherein the first configuration specifies a different set of ports than the second configuration.

2. The method of claim 1, wherein the plurality of instructions comprises an operation and a switch name of the first switch.

3. The method of claim 2, wherein the operation is a naming operation.

4. The method of claim 2, wherein the operation is one selected from the group consisting of a connection operation and a disconnection operation.

5. The method of claim 2, wherein the switch name comprises a concentrator identifier for a concentrator and a port identifier for a port on the concentrator connected to the first switch.

6. The method of claim 3, wherein the switch name is an alias for the first switch, wherein the naming operation associates a unique identifier for the first switch with the alias, wherein the unique identifier comprises a concentrator identifier for a concentrator and a port identifier for a port on the concentrator connected to the first switch, and wherein the unique identifier is specified in the switch program.

7. The method of claim 1, wherein the switch program is interpreted by the switch controller.

8. A computer readable medium for configuring a plurality of switches using a switch controller comprising instructions configured to:
   obtain a switch program, wherein the switch program comprises a plurality of instructions written using a switch control language, wherein the plurality of instructions in the switch program identify the plurality of switches, and wherein the switch program defines a heterogeneous configuration of the plurality of switches; and
   execute the switch program on the switch controller, wherein executing the switch program during a single execution of the switch program comprises:
      identifying, from the plurality of instructions, a first switch of the plurality of switches;
      sending a first configuration to the first switch, wherein the first configuration is defined for the first switch in the plurality of instructions;
      configuring the first switch according to the first configuration;
      identifying, from the plurality of instructions, a second switch of the plurality of switches;

sending a second configuration to the second switch, wherein the second configuration is defined for the second switch in the plurality of instructions; and configuring the second switch according to the second configuration, wherein the second switch is not configured with the first configuration, and wherein the first configuration specifies a different set of ports than the second configuration.

9. The computer readable medium of claim 8, wherein the switch program is interpreted by the switch controller.

10. The computer readable medium of claim 8, wherein the plurality of instructions comprises an operation and a switch name of the first switch.

11. The computer readable medium of claim 10, wherein the operation is a naming operation.

12. The computer readable medium of claim 10, wherein the operation is one selected from the group consisting of a connection operation and a disconnection operation.

13. The computer readable medium of claim 10, wherein the switch name comprises a concentrator identifier for a concentrator and a port identifier for a port on the concentrator connected to the first switch.

14. The computer readable medium of claim 11, wherein the switch name is an alias for the first switch, wherein the naming operation associates a unique identifier for the first switch with the alias, wherein the unique identifier comprises a concentrator identifier for a concentrator and a port identifier for a port on the concentrator connected to the first switch, and wherein the unique identifier is in the switch program.

15. A system for configuring a plurality of switches comprising:

a switch program, wherein the switch program comprises a plurality of instructions written using a switch control language, wherein the plurality of instructions in the switch program identify the plurality of switches, and wherein the switch program defines a heterogeneous configuration of the plurality of switches;

a switch controller accessing the switch program configured to execute the switch program, wherein executing the switch program during a single execution of the switch program comprises:

identifying, from the plurality of instructions, a first switch of the plurality of switches;

sending a first configuration to the first switch, wherein the first configuration is defined for the first switch in the plurality of instructions;

configuring the first switch according to the first configuration;

identifying, from the plurality of instructions, a second switch of the plurality of switches;

sending a second configuration to the second switch, wherein the second configuration is defined for the second switch in the plurality of instructions; and configuring the second switch according to the second configuration, wherein the second switch is not configured with the first configuration, and wherein the first configuration specifies a different set of ports than the second configuration.

16. The system of claim 15, wherein the plurality of instructions comprises an operation and a switch name of the first switch.

17. The system of claim 16, wherein the operation is a naming operation.

18. The system of claim 16, further comprising a plurality of computing devices accessible by the first switch.

19. The system of claim 16, further comprising a concentrator with a concentrator port connected to the first switch.

20. The system of claim 16, wherein the switch controller and the switch program are located on a master, wherein the master allows input of the switch program from a user.

* * * * *